UNITED STATES PATENT OFFICE.

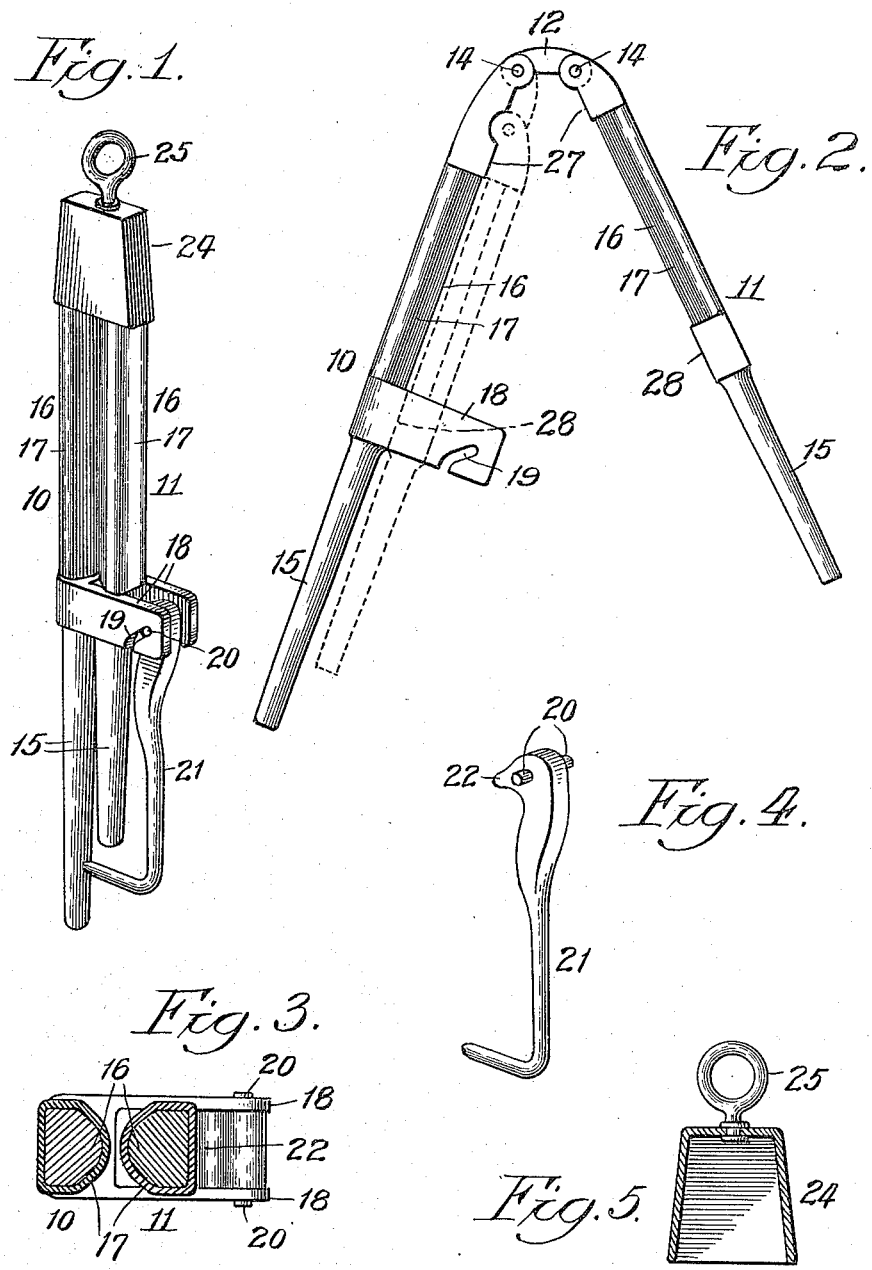

CORNELIUS 'T HOEN, OF MAYWOOD, ILLINOIS.

STERILIZING DEVICE.

1,170,536.  Specification of Letters Patent.  Patented Feb. 8, 1916.

Application filed August 3, 1914.  Serial No. 854,656.

*To all whom it may concern:*

Be it known that I, CORNELIUS 'T HOEN, a resident of Maywood, in the county of Cook and State of Illinois, have invented certain new and useful Improvements in Sterilizing Devices, of which the following is a full, clear, and exact description.

The invention relates to sterilizing devices.

It is now common practice to castrate animals by cutting the scrotum to remove the testicles and then to sever the spermatic cords. This operation, besides being painful, sometimes results in hemorrhage and serious injury to the animal.

The present invention designs to overcome the obstacles to this method of castration by providing a suitable tool or device which will avoid the necessity of cutting the cords and scrotum, and this object is attained by providing an instrument which may be applied externally to the scrotum to crush the spermatic cords without material injury to the scrotum.

I have discovered that by crushing the spermatic cords the testicles or glands are absorbed or dried up, so that the same result is accomplished as when the testicles are entirely removed from the scrotum by a cutting operation.

The invention consists in the several novel features hereinafter set forth and more particularly defined by claims at the conclusion hereof.

In the drawings: Figure 1 is a perspective view of the improved instrument, the parts being shown in operative position. Fig. 2 is a side elevation, the parts being shown in open position. Fig. 3 is a section. Fig. 4 is a detail of the locking lever. Fig. 5 is a detail section of the removable cap.

The improved instrument comprises two jaws or members, 10, 11, which are pivotally connected or joined by a link 12 having its ends pivoted respectively, as at 14, to the inner ends of the members 10, 11. Each of said members comprises a handle 15 and a clamping surface 16 which is covered with leather, as at 17, to exert a yielding pressure upon the scrotum and prevent it from being injured or cut by the jaws. The link 12 forms a double joint or hinge connection between the members, which permits the jaws to be separated sufficiently to receive the scrotum without swinging the jaws to approximately 90° apart. By providing this double joint, the instrument can be more conveniently applied without interference by the legs of the animal.

Member 10 is provided with a pair of lugs 18, each having a slot 19 therein which forms a pivotal seat for a pin 20 which passes through a lever 21 having a cam 22 thereon, which is adapted to force the jaws together sufficiently to cause the spermatic cords to be crushed. Slots 19 permit lever 21 to be removed, when it is desired to swing jaw 11 into or out of operative position. A cap 24 is adapted to slip over the pivotally connected ends of members 10, 11 and link 12 to lock one end of the members together. A ring 25 on said cap serves as a handle for manipulating the cap onto the tool and for removing it therefrom. Each of the members 10, 11 is formed with an abutment 27 and with an abutment 28, which, when the jaws are closed, prevent the covered pressure surfaces 16 from coming together sufficiently to exert excessive pressure upon the scrotum, these surfaces being separated just enough—usually about $\frac{1}{16}$th of an inch—to avoid injury to the scrotum, when both ends of the members are locked together.

In operation, the members 10, 11 are brought together around the scrotum and above the testicles, so the spermatic cords and scrotum will lie between the members. Cap 24 is then forced over the inner ends of the members to lock them in place and to hold link 12 in substantially parallel relation to member 10. The lever 21 is then connected to lugs 18 and swung into position to cause the cam 22 thereon to force the jaws together sufficiently to crush the spermatic cords by externally applied pressure of the leather-covered portions of the members. When the members are thus locked together, the covered portions thereof will be in parallel relation and spaced apart slightly to avoid substantial pressure on the scrotum, and these surfaces will cause the cords to be crushed, because they are usually considerably thicker than the space left between the covered portions of the members. The instrument is left on the animal until the spermatic cords have been entirely devitalized, usually about half a minute to a minute. When this result has been attained, the cap 24 is removed, lever 21 is swung into position to release the pressure upon member 11 and removed from lugs 18. The members can then be opened to release the scrotum.

Manifestly, the sterilizing operation, as it may be performed by the improved instrument, is effected without cutting of the scrotum or spermatic cords and without the loss of blood, or hemorrhage.

The improved instrument is distinguished from the devices heretofore used in this art in lacking any cutting or severing instrumentality, and by making provision for the application of crushing pressure to the spermatic cords through the scrotum, and by locking the instrument in operative position until the desired result has been attained.

The invention is not to be understood as restricted to the details set forth, since these may be modified without departing from the spirit and scope of the invention.

Having thus described my invention, what I claim as new, and desire to secure by Letters Patent, is:—

1. A sterilizing device comprising members provided with coöperating surfaces adapted to apply pressure externally to the scrotum of an animal, stop-means between the members whereby they will be spaced apart and in position to cause the members to crush a cord in the scrotum, without cutting it, and means for holding the members in operative position to keep the cord under pressure.

2. A sterilizing device comprising members provided with coöperating round surfaces to apply pressure externally to the scrotum of an animal, stop-means between the members whereby they will be spaced apart and in position to crush a cord in the scrotum, without cutting it, and means for holding the members in operative position to keep the cord under pressure.

3. A sterilizing device comprising members provided with coöperating surfaces adapted to apply pressure externally to the scrotum of an animal, a covering of soft material on said surfaces to prevent them from cutting the scrotum, stop-means between the members, whereby they will be spaced apart and in position to crush a cord in the scrotum, without cutting it, and means for holding the members in operative position to keep the cord under pressure.

4. A sterilizing device, comprising members provided with coöperating surfaces adapted to apply pressure externally to the scrotum of an animal to crush a cord in the scrotum, means for forcing the members together in operative position, and locking them to keep the cord under pressure, and stops between said members for holding them spaced apart sufficiently to prevent cutting of the scrotum.

5. A sterilizing device comprising members formed to apply pressure externally to the scrotum of an animal to crush a cord in the scrotum without cutting the scrotum, a link connection between said members, means for locking the link in substantially parallel relation to one of the members when the latter are in operative position, and means for forcing the members together.

6. A sterilizing device, comprising members formed to apply pressure externally to the scrotum of an animal to crush a cord in the scrotum without cutting the scrotum, a link connection between one end of the members, a cap to fit over said connection and lock the link and members together, and means for forcing the other end of the members into operative position.

7. A sterilizing device, comprising members provided with coöperating surfaces adapted to apply pressure externally to the scrotum of an animal, stop-means between the members, whereby they will be spaced apart and in position to crush a cord in the scrotum without cutting the scrotum, a pivotal connection between one end of the members, lugs on one of the members, a cam-lever for forcing the other end of the members into operative position, and a separable pin and slot connection between said lugs and the lever.

CORNELIUS 'T HOEN.

Witnesses:
MILDRED STUMPF,
KATHARINE GERLACH.

Copies of this patent may be obtained for five cents each, by addressing the "Commissioner of Patents, Washington, D. C."